(12) United States Patent
Steger et al.

(10) Patent No.: US 11,857,045 B2
(45) Date of Patent: *Jan. 2, 2024

(54) MULTIFUNCTIONAL CASE FOR ELECTRONICS-ENABLED EYEWEAR

(71) Applicant: Snap Inc., Santa Monica, CA (US)

(72) Inventors: Stephen Andrew Steger, Santa Monica, CA (US); Tiffany Ming Tsao, Saratoga, CA (US); Qiaokun Huang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/581,183

(22) Filed: Jan. 21, 2022

(65) Prior Publication Data
US 2022/0320878 A1 Oct. 6, 2022

Related U.S. Application Data

(63) Continuation of application No. 15/716,206, filed on Sep. 26, 2017, now Pat. No. 11,233,411.

(60) Provisional application No. 62/400,058, filed on Sep. 26, 2016.

(51) Int. Cl.
*H02J 7/00* (2006.01)
*H02J 7/14* (2006.01)
*A45C 11/04* (2006.01)
*H02J 7/34* (2006.01)

(52) U.S. Cl.
CPC ............ *A45C 11/04* (2013.01); *H02J 7/0044* (2013.01); *H02J 7/0047* (2013.01); *H02J 7/342* (2020.01); *H02J 7/0048* (2020.01)

(58) Field of Classification Search
CPC ........ H02J 7/342; H02J 7/0044; H02J 7/0047; H02J 7/0048
USPC ........................................................ 320/134
See application file for complete search history.

(56) References Cited

U.S. PATENT DOCUMENTS

| 5,002,184 A | 3/1991 | Lloyd |
| 5,016,749 A * | 5/1991 | Kaye ..................... A45C 11/046 206/5 |
| 5,455,637 A | 10/1995 | Kallman et al. |

(Continued)

FOREIGN PATENT DOCUMENTS

| CA | 2887596 | 7/2015 |
| CN | 1375249 | 10/2002 |

(Continued)

OTHER PUBLICATIONS

U.S. Appl. No. 15/716,206 U.S. Pat. No. 11,233,411, filed Sep. 26, 2017, Multifunctional Case for Electronics-Enabled Eyewear.

(Continued)

*Primary Examiner* — Alexis B Pacheco
(74) *Attorney, Agent, or Firm* — Schwegman Lundberg & Woessner, P.A.

(57) ABSTRACT

A carry case for an electronics-enabled eyewear device has incorporated therein electronic components for connection to the eyewear device while storing the eyewear device. The case comprises a rigid frame structure defining an openable holding space for the pair of smart glasses, and a compressible shock-resistant protective cover on the frame structure. The exterior of the case may be predominantly defined by the shock resistant protective cover.

20 Claims, 8 Drawing Sheets

(56) References Cited

U.S. PATENT DOCUMENTS

| | | | |
|---|---|---|---|
| 5,900,720 A * | 5/1999 | Kallman | G02F 1/163 351/44 |
| 6,026,950 A | 2/2000 | Wisniewski | |
| 6,038,295 A | 3/2000 | Mattes | |
| 6,398,017 B1 | 6/2002 | Cafiero | |
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,390,255 B1 | 3/2013 | Fathollahi | |
| 8,718,333 B2 | 5/2014 | Wolf et al. | |
| 8,724,622 B2 | 5/2014 | Rojas | |
| 8,818,464 B2 | 8/2014 | Olsson et al. | |
| 8,874,677 B2 | 10/2014 | Rosen et al. | |
| 8,881,893 B1 | 11/2014 | Cheng et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 10,256,645 B1 | 4/2019 | Shipman et al. | |
| 10,928,658 B1 | 2/2021 | Ashwood et al. | |
| 11,233,411 B2 * | 1/2022 | Steger | H02J 7/342 |
| 2004/0198470 A1 | 10/2004 | Dyer et al. | |
| 2005/0242771 A1 | 11/2005 | Blum et al. | |
| 2009/0021209 A1 | 1/2009 | Lin | |
| 2009/0106567 A1 | 4/2009 | Baarman | |
| 2009/0114550 A1 * | 5/2009 | Ying | A45C 15/00 206/5 |
| 2010/0294675 A1 | 11/2010 | Mangano | |
| 2011/0062911 A1 | 3/2011 | Cuthbert et al. | |
| 2011/0202598 A1 | 8/2011 | Evans et al. | |
| 2011/0204843 A1 | 8/2011 | Foster | |
| 2011/0218502 A1 | 9/2011 | Iio et al. | |
| 2012/0169278 A1 | 7/2012 | Choi et al. | |
| 2012/0209924 A1 | 8/2012 | Evans et al. | |
| 2013/0314303 A1 | 11/2013 | Osterhout et al. | |
| 2014/0084860 A1 | 3/2014 | Jaax et al. | |
| 2015/0010806 A1 | 1/2015 | Huang et al. | |
| 2015/0156297 A1 | 6/2015 | Crawford et al. | |
| 2015/0200554 A1 * | 7/2015 | Marks | H02J 50/90 320/108 |
| 2016/0072327 A1 | 3/2016 | Knutson et al. | |
| 2016/0134142 A1 * | 5/2016 | Murphy | H02J 50/10 455/573 |
| 2016/0365745 A1 | 12/2016 | Hyun | |
| 2016/0373899 A1 | 12/2016 | Celinski et al. | |
| 2017/0064429 A1 | 3/2017 | Hirsch et al. | |
| 2017/0131575 A1 | 5/2017 | Howell et al. | |
| 2017/0134063 A1 * | 5/2017 | Lee | H04M 1/21 |
| 2017/0170676 A1 * | 6/2017 | Cheah | H01L 25/18 |
| 2017/0170859 A1 | 6/2017 | Noori et al. | |
| 2017/0297438 A1 * | 10/2017 | Park | H02J 50/90 |
| 2017/0303656 A1 * | 10/2017 | Sabie | A45C 11/04 |
| 2018/0090958 A1 | 3/2018 | Steger et al. | |
| 2018/0102606 A1 | 4/2018 | Tham et al. | |
| 2018/0166894 A1 | 6/2018 | Miller et al. | |

FOREIGN PATENT DOCUMENTS

| | | |
|---|---|---|
| CN | 2925193 | 7/2007 |
| CN | 201192148 | 2/2009 |
| CN | 201557685 | 8/2010 |
| CN | 203369502 | 1/2014 |
| CN | 109843112 | 6/2019 |
| EP | 3515232 | 11/2021 |
| JP | 9154616 | 6/1997 |
| KR | 102251133 | 5/2021 |
| WO | 2015149074 | 10/2015 |
| WO | 2018058130 | 3/2018 |

OTHER PUBLICATIONS

"International Application Serial No. PCT US2017 053518, International Search Report dated Jan. 2, 2018", 3 pgs.

"International Application Serial No. PCT US2017 053518, Written Opinion dated Jan. 2, 2018", 5 pgs.

"International Application Serial No. PCT US2017 053518, International Preliminary Report on Patentability dated Apr. 4, 2019", 7 pgs.

"U.S. Appl. No. 15/716,206, Non Final Office Action dated May 28, 2019", 16 pgs.

"U.S. Appl. No. 15/716,206, Response filed Sep. 30, 2019 to Non-Final Office Action dated May 28, 2019", 9 pgs.

"U.S. Appl. No. 15/716,206, Final Office Action dated Nov. 29, 2019", 17 pgs.

"European Application Serial No. 17781594.1, Communication Pursuant to Article 94(3) EPC dated Feb. 19, 2020", 3 pgs.

"U.S. Appl. No. 15/716,206, Response filed Mar. 2, 2020 to Final Office Action dated Nov. 29, 2019", 10 pgs.

"U.S. Appl. No. 15/716,206, Non Final Office Action dated Mar. 20, 2020", 17 pgs.

"Chinese Application Serial No. 201780058958.8, Office Action dated Apr. 9, 2020", w English translation, 15 pgs.

"U.S. Appl. No. 15/716,206, Response filed Jun. 22, 2020 to Non Final Office Action dated Mar. 20, 2020", 11 pgs.

"European Application Serial No. 17781594.1, Response filed Jun. 19, 2020 to Communication Pursuant to Article 94(3) EPC dated Feb. 19, 2020", 17 pgs.

"Chinese Application Serial No. 201780058958.8, Response filed Aug. 24, 2020 to Office Action dated Apr. 9, 2020", w English Claims, 11 pgs.

"U.S. Appl. No. 15/716,206, Final Office Action dated Sep. 24, 2020", 18 pgs.

"European Application Serial No. 17781594.1, Communication Pursuant to Article 94(3) EPC dated Oct. 22, 2020", 5 pgs.

"Chinese Application Serial No. 201780058958.8, Office Action dated Oct. 14, 2020", w English translation, 15 pgs.

"Korean Application Serial No. 10-2019-7011794, Notice of Preliminary Rejection dated Nov. 13, 2020", w English Translation, 10 pgs.

"U.S. Appl. No. 15/716,206, Response filed Dec. 28, 2020 to Final Office Action dated Sep. 24, 2020", 10 pgs.

"Chinese Application Serial No. 201780058958.8, Response filed Dec. 25, 2020 to Office Action dated Oct. 14, 2020", w English Claims, 10 pgs.

"Korean Application Serial No. 10-2019-7011794, Response filed Jan. 13, 2021 to Notice of Preliminary Rejection dated Nov. 13, 2020", w English Claims, 26 pgs.

"U.S. Appl. No. 15/716,206, Non Final Office Action dated Mar. 10, 2021", 20 pgs.

"Chinese Application Serial No. 201780058958.8, Decision of Rejection dated Feb. 9, 2021", w English Translation, 13 pgs.

"European Application Serial No. 17781594.1, Response filed Mar. 1, 2021 to Communication Pursuant to Article 94(3) EPC dated Oct. 22, 2020", 3 pgs.

"U.S. Appl. No. 15/716,206, Response filed Aug. 10, 2021 to Non Final Office Action dated Mar. 10, 2021", 10 pgs.

"U.S. Appl. No. 15/716,206, Notice of Allowance dated Sep. 17, 2021", 7 pgs.

Leyden, John, "This SMS will self-destruct in 40 seconds", [Online] Retrieved from the Internet: URL: http: www.theregister.co.uk 2005 12 12 stealthtext , (Dec. 12, 2005), 1 pg.

"Chinese Application Serial No. 201780058958.8, Decision of Reexamination dated Mar. 31, 2023", w/ English Translation, 20 pgs.

(56) References Cited

OTHER PUBLICATIONS

"Chinese Application Serial No. 201780058958.8, Notice of Reexamination dated Oct. 10, 2022", w/ English Translation, 17 pgs.

* cited by examiner

US 11,857,045 B2

MULTIFUNCTIONAL CASE FOR ELECTRONICS-ENABLED EYEWEAR

CLAIM OF PRIORITY

This application is a continuation of U.S. patent application Ser. No. 15/716,206, filed on Sep. 26, 2017, which claims the benefit of priority to U.S. Provisional Application Ser. No. 62/400,058, filed on Sep. 26, 2016, each of which are hereby incorporated by reference herein in their entireties.

TECHNICAL FIELD

The subject matter disclosed herein generally relates to holders for electronics-enabled eyewear. In particular embodiments, the present disclosure addresses apparatuses, systems and methods for eyewear cases having functionality for electronic and/or electrical connectivity with an electronics-enabled eyewear device when held in the case.

BACKGROUND

Electronics-enabled eyewear devices (e.g., so-called smart glasses) typically have integrated electronics requiring an onboard power supply, such as a battery. Such batteries are usually relatively small and require regular recharging. Regular connection to a charging outlet for these purposes, however, can frustrate user satisfaction with such devices. This disclosure provides for a smart glasses holder or carry case that is a multifunctional in that it not only stows the glasses for safe transportation, but that it at the same time serves as a docking station for charging of the smart glasses battery.

Conventional eyewear carry cases often provide cushioning or padding in an internal holding space in which glasses are stowed. The padding or cushioning to at least some extent protects the carried glasses against shocks that may be experienced in use, for example when the cases are dropped or bumped.

BRIEF DESCRIPTION OF THE DRAWINGS

Various ones of the appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings.

OVERVIEW

Figure 1:
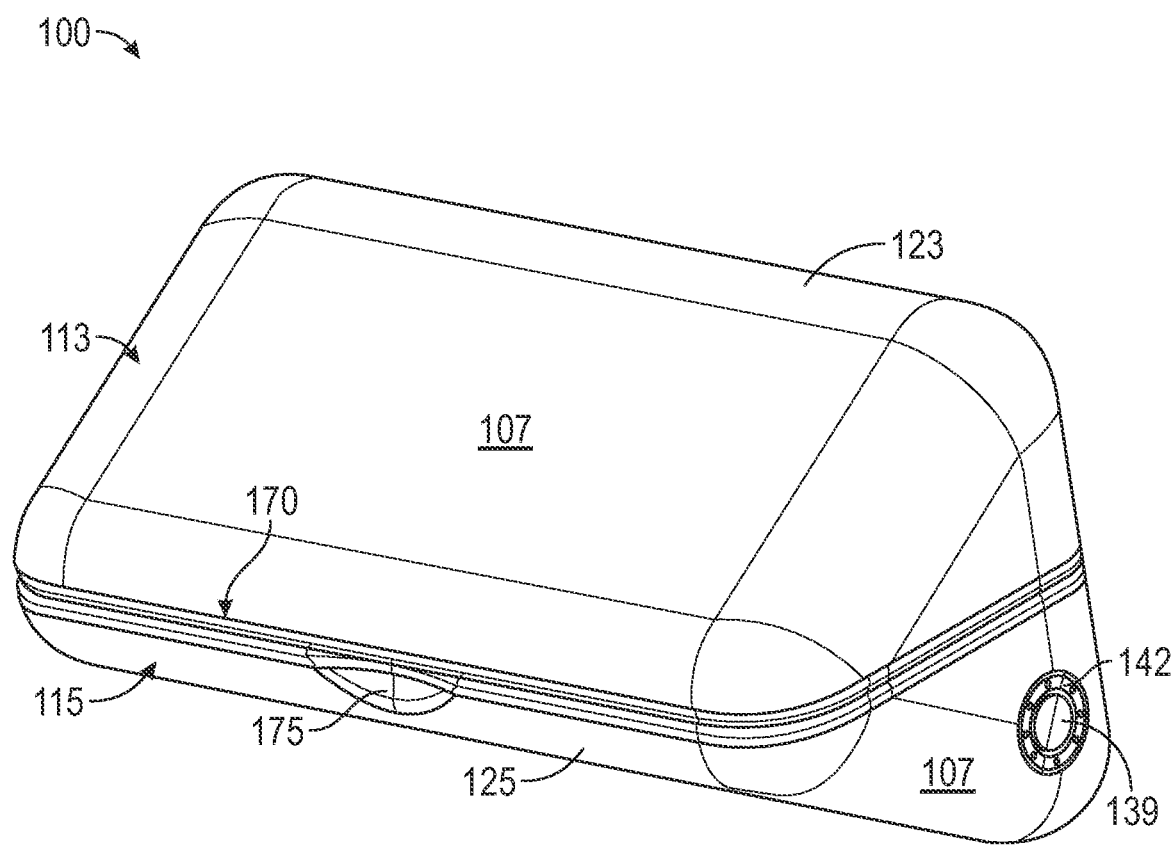
FIG. 1 is a three-dimensional front view of a carry case for an electronics-enabled eyewear device, according to an example embodiment, the case being in a closed condition.

One aspect of the disclosure provides a charging case for a pair of smart glasses, the case comprising a rigid frame structure defining an openable holding space for the pair of smart glasses, and a nonrigid, shock-resistant protective cover on the frame structure. In some embodiments, an exterior of the case may be predominantly defined by the shock resistant protective cover.

As will be seen from the description of example embodiments with reference to the drawings, such an external shock-resistant cover provides shock protection not only for an eyewear device carried in the case, but additionally protects electronics components carried in the case. Furthermore, some embodiments provides for the establishment of a charging and/or data connection between the eyewear device and the case in which it is carried. In such cases, cushioning or padding inside the case, as with conventional carry cases, could problematically compromise integrity of the charging connection by allowing movement of the glasses relative to a connector on the case. Provision of a shock-reducing compressible protective layer outside of a substantially rigid case structure, serves to protect against minor shocks and bumps not only the glasses carried by the case, but also electronics housed within the case structure. Additionally, such an external protective cover promotes positive connection between the case and glasses housed therein by reducing relative movement of the glasses and the case, compared to existing carry cases having a hard outer shell and internal padding or cushioning in which the glasses are received.

Some embodiments of this aspect of the disclosure thus provides a carry case for an electronics-enabled eyewear device, the case comprising:

a substantially rigid frame that defines an interior holding space for the eyewear device, the frame being operable between an opened condition in which the holding space is accessible for insertion or removal of the eyewear device, and a closed condition;

a protective cover on the frame, the protective cover being of a compressible material;

one or more electronics components housed by the frame; and a connection arrangement carried by the frame and accessible to the eyewear device from the holding space, to enable coupling of the eyewear device, when located in the holding space, with the one or more electronics components of the case.

In this description, "compressible material" means a material that is perceptibly deformable in its thickness dimension responsive to forces in the order of magnitude to which carry cases are regularly exposed. Examples of such compressible materials includes materials conventionally used for cushioning or padding in carry cases, foams (e.g., solidified polymeric foam), sponge-like materials, and elastomeric materials, such as rubber. In contrast, "rigid" means that the relevant material or component generally sustains its own shape and is not of a compressible material as defined above.

The protective cover may be of a resiliently compressible material, for example being of a polymeric foam material. A resiliently compressible material generally returns to its original thickness after a compressive force ceases. In a particular example embodiment, the protective cover is of a polyurethane foam. In some embodiments, the protective cover is an outermost component of the carry case, such that an exterior surface of the case is predominantly defined by the protective cover. In some embodiments, the protective cover is an overmolded component, for example comprising a polymeric foam overmolded on an injection-molded thermoplastics frame. In other embodiments, the protective cover may be provided by one or more separately constructed pieces received on the frame, for example comprising a pair of rubber halves attached to respective frame halves.

The frame may be provided by a formed sheet material. In this context, formed sheet material does not mean that a sheet stock material was deformed into a final shape, but rather means that the frame has a three-dimensional shape defined by a material having a relative small thickness dimension. In some embodiments, the frame is provided by injection-molded plastics material. In other embodiments, the frame may be formed from a flat sheet stock.

In some embodiments, the frame is at least partially formed of a thermoplastic material, the protective cover being provided on an exterior surface of the frame. In one example, the frame of polycarbonate and/or acrylonitrile butadiene styrene (ABS). In some embodiments, at least part of the frame (e.g., a part of the frame directly bordering a battery forming part of the one or more electronics components) is provided by a fire-resistant material, such as a glass-filled nylon plastic.

The one or more electronics components housed by the frame in some embodiments include a charging battery, with the connection arrangement being configured to provide a charging coupling between the charging battery of the case and an onboard battery on the eyewear device.

In some embodiments, the frame is of clamshell configuration, comprising two halves that are connected together for hinged displacement relative to one another between the open condition and the closed condition. In some such embodiments, one of the frame halves defines a housing cavity within which a charging battery forming part of the one or more electronics components is housed such that the charging battery in substantially enclosed by rigid material of the frame. In this manner, the battery is isolated from contact with either the protective cover or the holding space.

In one example embodiment, the housing cavity is defined between a pair of rigid shells that are connected together to form a composite half of the rigid frame. The pair of shells that together form one half of the rigid frame may be analogous in shape, so that a convexity of one of the shells fits within a concavity of the other such that the housing cavity is defined between the two shells.

At least part of housing cavity for the battery is in some embodiments defined by a fire-resistant material that is tolerant of the continuous operating temperatures corresponding to that of the charging battery. In this manner, fire risks associated with the charging and operation of rechargeable batteries are ameliorated by location of the battery in an at least partially heat-resistant and/or fire resistant compartment. By fire-resistant in this context is meant that the relevant material/component has a maximum continuous working temperature above 80° C. In one example embodiment, the housing cavity is partially defined by a glass-filled nylon plastic material that has a specified maximum allowable continuous service temperature in air of more than 100° C.

The housing cavity is in some embodiments permanently closed (e.g., being sealed), such as to prevent user access to contents of the housing cavity without damage to a structure defining the housing cavity. In other embodiments, the housing cavity is semi-permanently closed, by which is meant that the housing cavity is openable and re-closeable, but that it is not constructed for ready and accessible access.

In some embodiments, the carry case includes a control button accessible on an exterior thereof, the control button being operably connected to the one or more electronics components to enable user control of operation of the one or more electronics components via the control button. In one example embodiment, the electronics components are configured to enable reset of an electronics function of the carry case by user operation of the control button.

In some embodiments, the carry case further includes a charge level indicator on an exterior of the case, the charge level indicator being operable to provide a visual indication of a charging status of a battery forming part of the one or more electronics components of the case. In a particular embodiment, the charge level indicator comprises a series of lighting devices (e.g., LEDs) arranged peripherally about the control button.

Instead, or in addition, some embodiments a charge level indicator on an exterior of the case is operable to provide a visual indication of a charging status of a battery forming part of an eyewear device located in the holding space and coupled to the one or more electronics components via the connection arrangement. In some embodiments, a common charge level indicator is used in one operational mode to indicate the case battery charge, and is used in another operational mode to indicate the eyewear battery charge level. Thus, for example, while the eyewear device is stowed in the carry case, the charge level indicator can in one embodiment indicate charge level of the eyewear battery, e.g., responsive to a button press. While the carry case is, however, in such an embodiment connected to an external power supply for charging of the case battery, charge level indicator can indicate case battery charge level.

Another aspect of the disclosure provides for a method comprising:
storing an electronics-enabled eyewear device in a carry case for the eyewear device, the case comprising:
a frame that having an interior that defines a holding space for the eyewear device;
a protective cover on the frame, the protective cover being of a compressible material; and
a charging battery housed by the frame;
establishing an electrical connection between the charging battery in the case and an on-board battery of the eyewear device via a connection arrangement forming part of the case; and
charging the on-board battery of the eyewear device via the arrangement while the eyewear device is located in the holding space.

As discussed previously, wherein the protective cover is in some example embodiments of a polymeric foam material that provides an outermost component of the carry case, such that an exterior surface of the case is predominantly defined by the protective cover.

The method may in some embodiments include operating a control button accessible on an exterior of the carry case to control operation of one or more electrical components incorporated in the carry case. Such operations can include triggering reset of case electronics, triggering display of a case battery charge level, or triggering display of an a charge level of an onboard battery forming part of an eyewear device stored in the case.

As mentioned, it is a benefit of the case in such example embodiments is that it provides shock resistant protection to electronics housed in the rigid frame of the case. This is in contrast to conventional cases, in which padding or shock resistant material is provided inside a rigid case, to primarily protect glasses carried in the case from damage when the case is subjected to shocks or bumps.

A further benefit of some of the disclosed embodiments is that heat-generating components of the charging case are substantially entirely bordered by rigid synthetic material, which is generally more heat tolerant and/or fire resistant than nonrigid cushioning or padding material.

Figure 2:
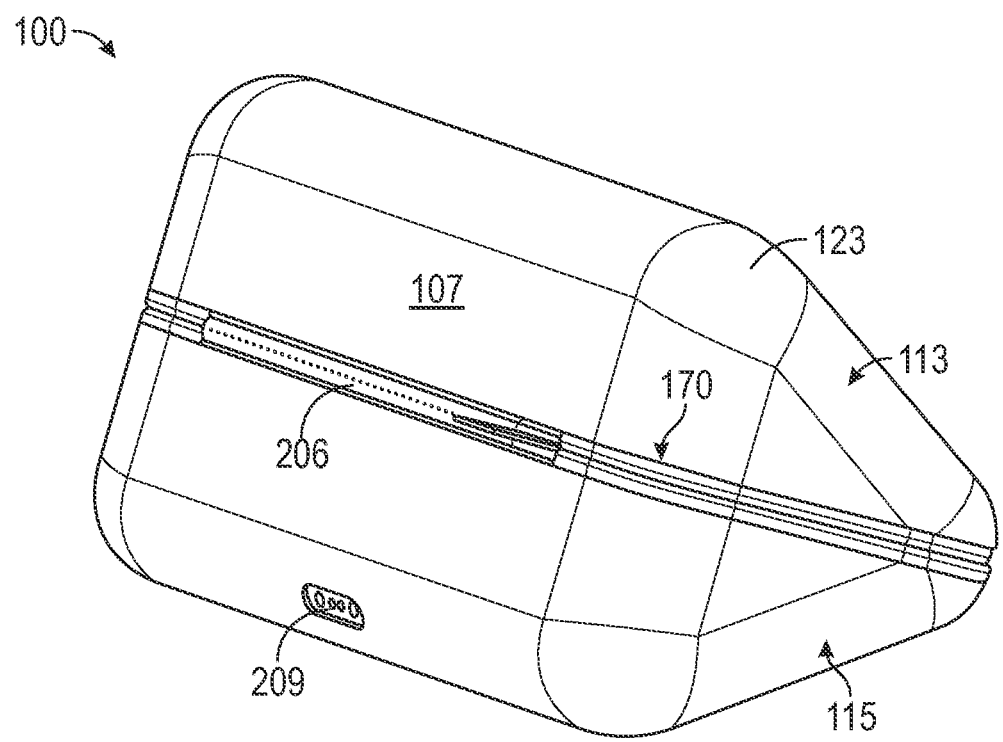
FIG. 2 is a three-dimensional rear view of the eyewear carry case according to the example embodiment of FIG. 1.
Figure 3:
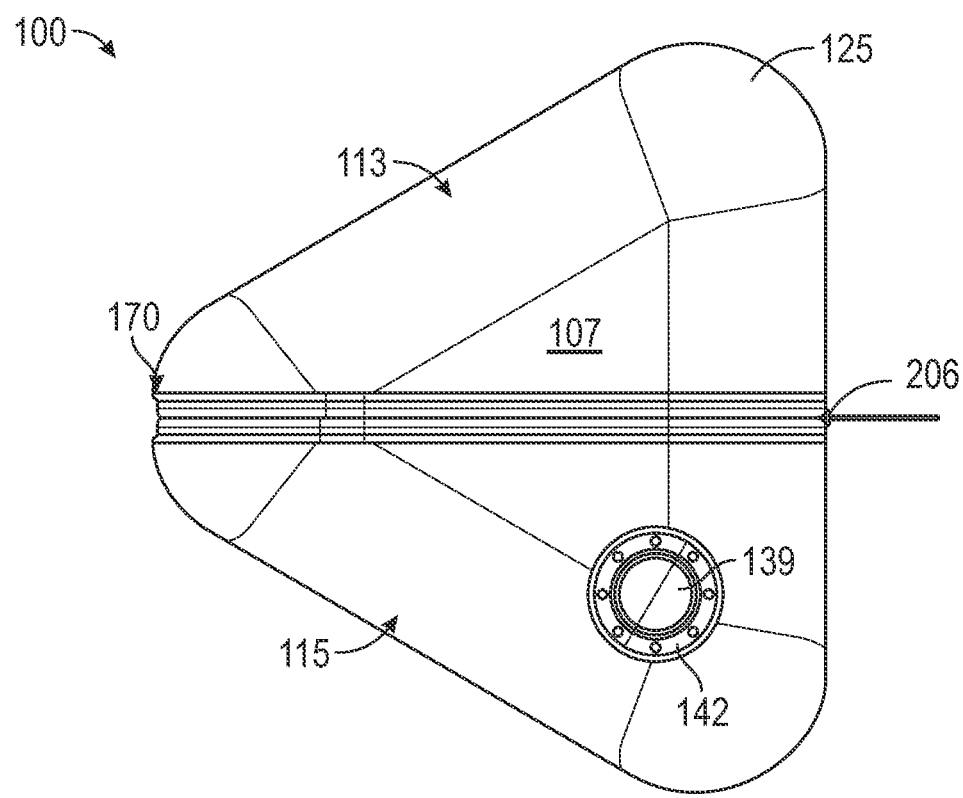
FIG. 3 is an end-on side view of the eyewear carry case according to the example embodiment of FIG. 1.

One example embodiment is schematically illustrated and described in FIGS. 1-9 of the drawings, in which the carry case is generally indicated by reference numeral 100. FIGS. 1-3 show respective exterior views of the example carry case 100 in a closed condition. As can be seen in FIG. 1, almost the entire exterior of the case 100 is provided by a protective cover 107 that is of a resiliently compressible polyurethane foam. The foam cover 107 thus provides a measure of shock-resistance to all components located within it.

In this example embodiment, the case 100 is a clamshell-type case, having two halves 113, 115 that are connected together for hinged displacement relative to one another about a hinge 206 (see FIG. 2) at abutting rear edges of the halves 113, 115. The halves 113, 115 can thus be hingedly moved between the closed condition shown in FIGS. 1-4, and an opened condition (FIGS. 5 and 9).

Figure 7:
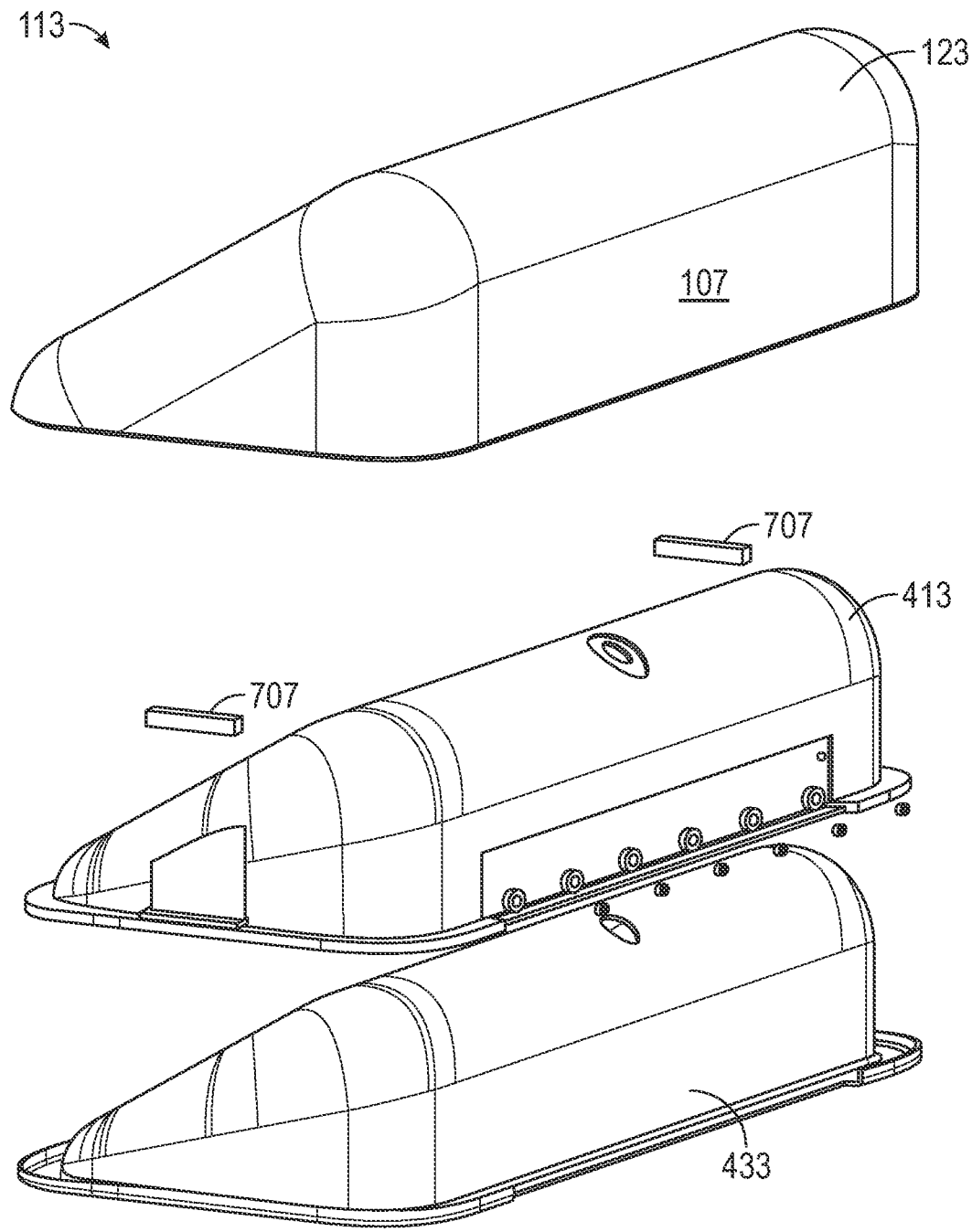
FIG. 7 is an exploded three-dimensional rear view of a top half of a carry case according to the example embodiment of FIG. 1.
Figure 8:
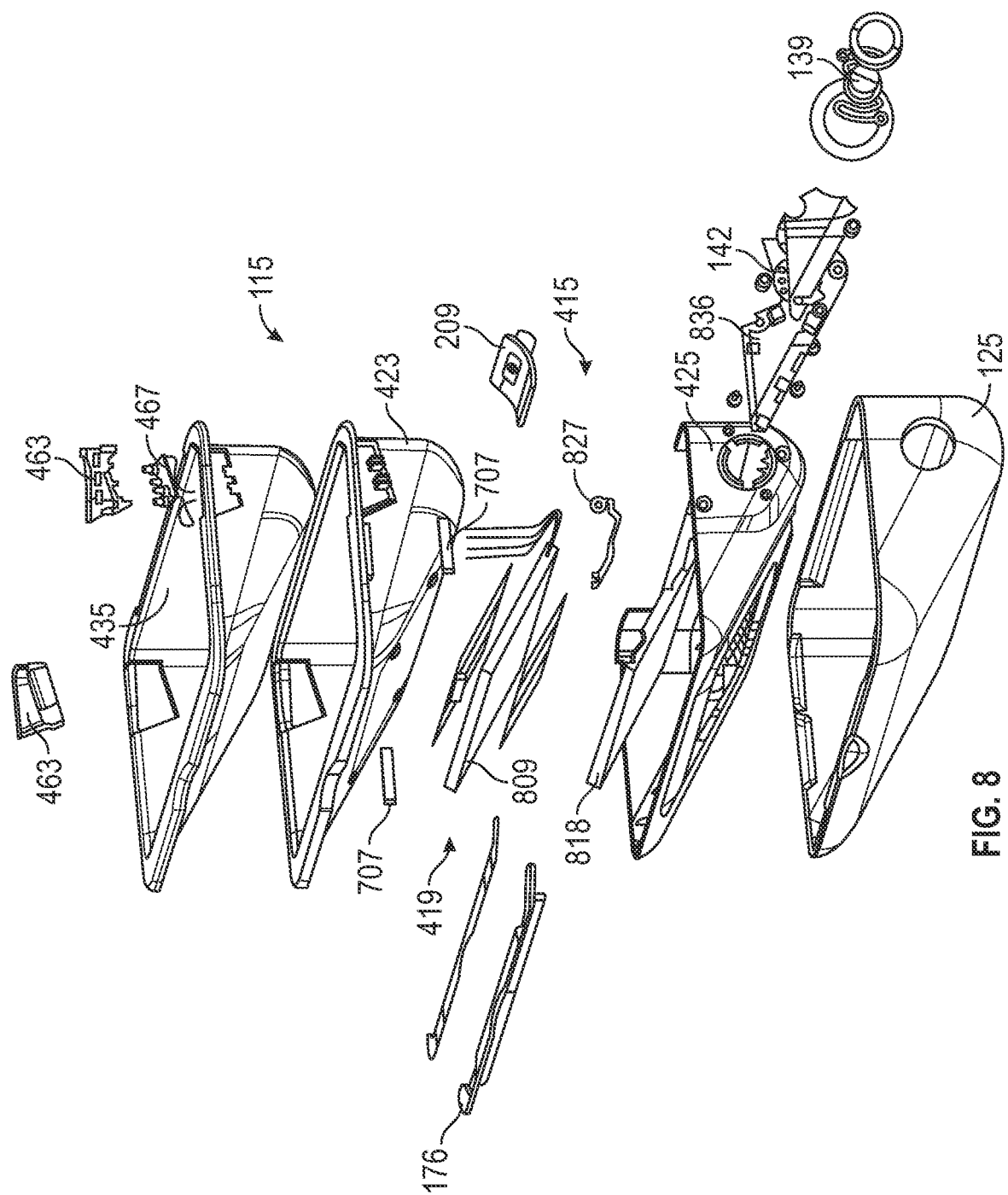
FIG. 8 is an exploded three-dimensional front view of a bottom half of a carry case according to the example embodiment of FIG. 1.

The protective cover 107 is in this example embodiment provided by two separate foam pieces (further referred to as the top foam 123 the bottom foam 125), best seen in FIGS. 7 and 8 respectively. As can be seen from these figures, the top foam 123 and bottom foam 125 fit snugly over respective parts of a rigid frame 408, thus providing a foam jacket for the case 100. In this example embodiment, the resiliently compressible material of the protective cover 107 is provided by a polyurethane foam.

Figure 9:
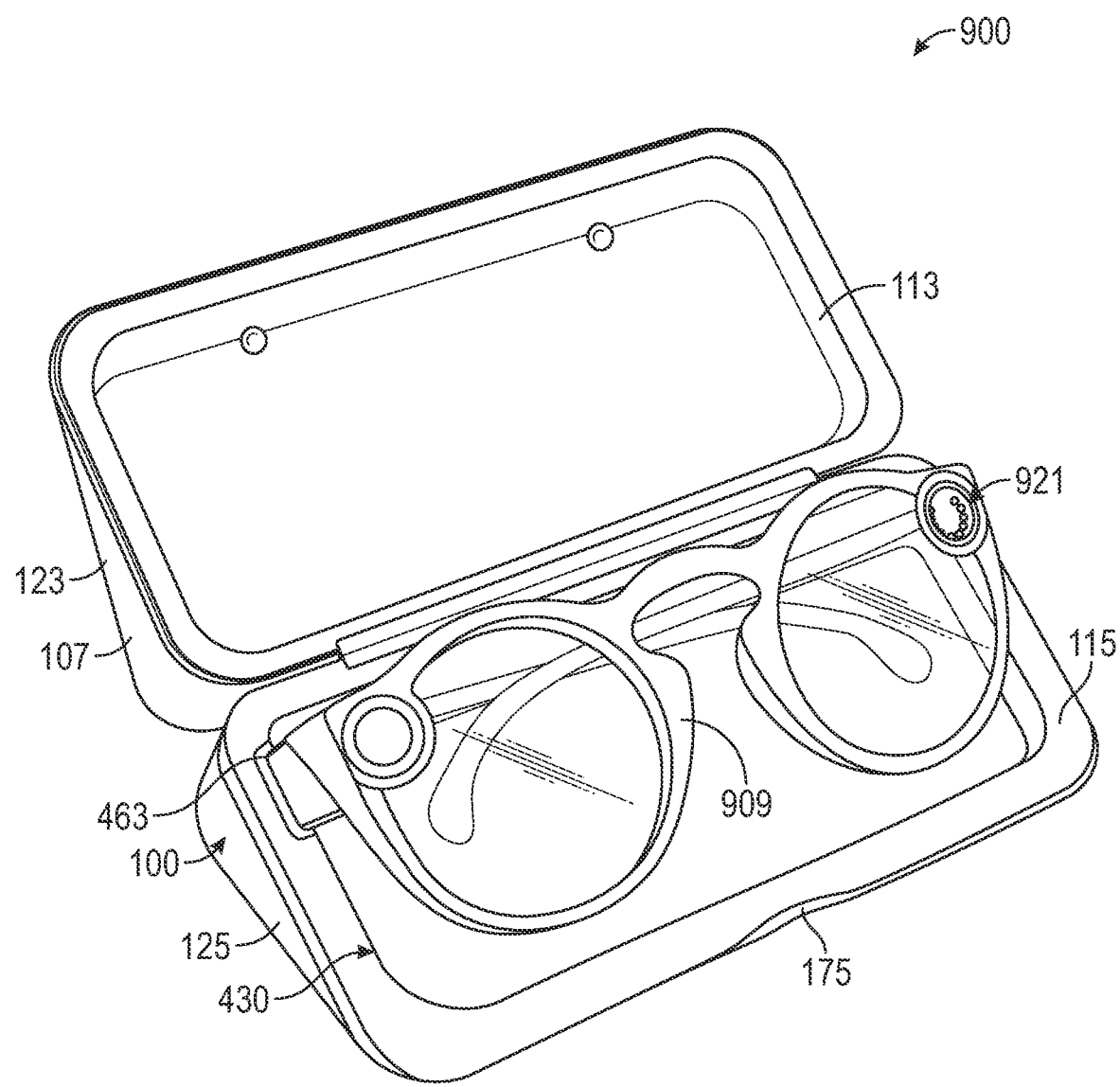
FIG. 9 is a three-dimensional front view of an eyewear kit comprising an eyewear device in the example form of a pair of smart glasses, and a complementary carry case, according to the example embodiment of FIG. 1.

Returning now to FIG. 1, the exterior of the multifunctional charging case 100 further includes a user input mechanism in the example form of a press button 139 connected to electronics incorporated in the case 100 for controlling one or more electronics functionalities of the case 100 and/or of an eyewear device (e.g., a pair of smart glasses 909 housed within the case 100, shown in FIG. 9). The exterior of the case 100 further includes a visual indicator 142 for displaying respective visual indications corresponding to one or more attributes or operational modes of the case 100 and/or of the glasses 909 housed therein. In this example embodiment, the indicator 142 comprises a ring of light emitters in the example form of LEDs arranged concentrically around the circular press button 139. As will be described later, a charge level of the case 100 or the glasses 909 can be indicated by the particular proportion of LEDs in the ring indicator 142 that are at lit at a particular time. Thus, the ring of LEDs providing the indicator 142 is at times partially illuminated, so that the proportion of the LED ring that is illuminated corresponds to the proportion of battery charge. In this example, the LEDs are located beneath a ring-shaped translucent cover, so that the LEDs of the indicator 142 are obscured from view when not lit up.

Observe that the concentric button 139 and indicator 142 are in register with a corresponding circular cutout in the bottom foam 125, thus exposing the button 139 and indicator 142 for user access and view. Additionally, note that the button 139 is located below flush with an external surface of the bottom foam 125, thus being protected from accidental activation of the button 139 when placed on a flat support surface. In some examples, the indicator 142 may be substantially flush with the foam cover 107. In other embodiments, all of the external features of the case 100 (in particular, the charging port 209, the button 139, the indicator 142, and the rims of the frame 408 at the seam gap 170) can be sub-flush relative to the protective cover 107.

Turning now to FIG. 2, therein can be seen an external charge port 209 for receiving a charge connector to enable charging of a battery 419 (FIG. 4) via an external power source. Again, a rounded oblong cutout in the bottom foam 125 coinciding with the charge port 209 exposes the charge port 209 for access by charging cable and/or connector.

The top foam 123 and the bottom foam 125 stop somewhat short of a plane at which the frame halves meet, thus defining between them a relatively narrow, peripherally extending seam gap 170. At a front of the case (FIG. 1), the seam gap 170 widens somewhat in a central location to expose a clasp 175 for manual user access. As can be seen in FIG. 2, the seam gap 170 is recessed, so that the cover 107 protects partially exposed rims of the rigid frame 408 against direct contact when the case 100 is, for example, dropped or bumped while in the closed condition.

As will be seen FIGS. 1-3, an exterior surface of the case 100 is thus predominantly provided by the protective foam cover 107, with the only exposed areas of the case exterior being the button 139 and indicator 142, the charge port 209, the seam gap 170, and the clasp 175.

Figure 4:
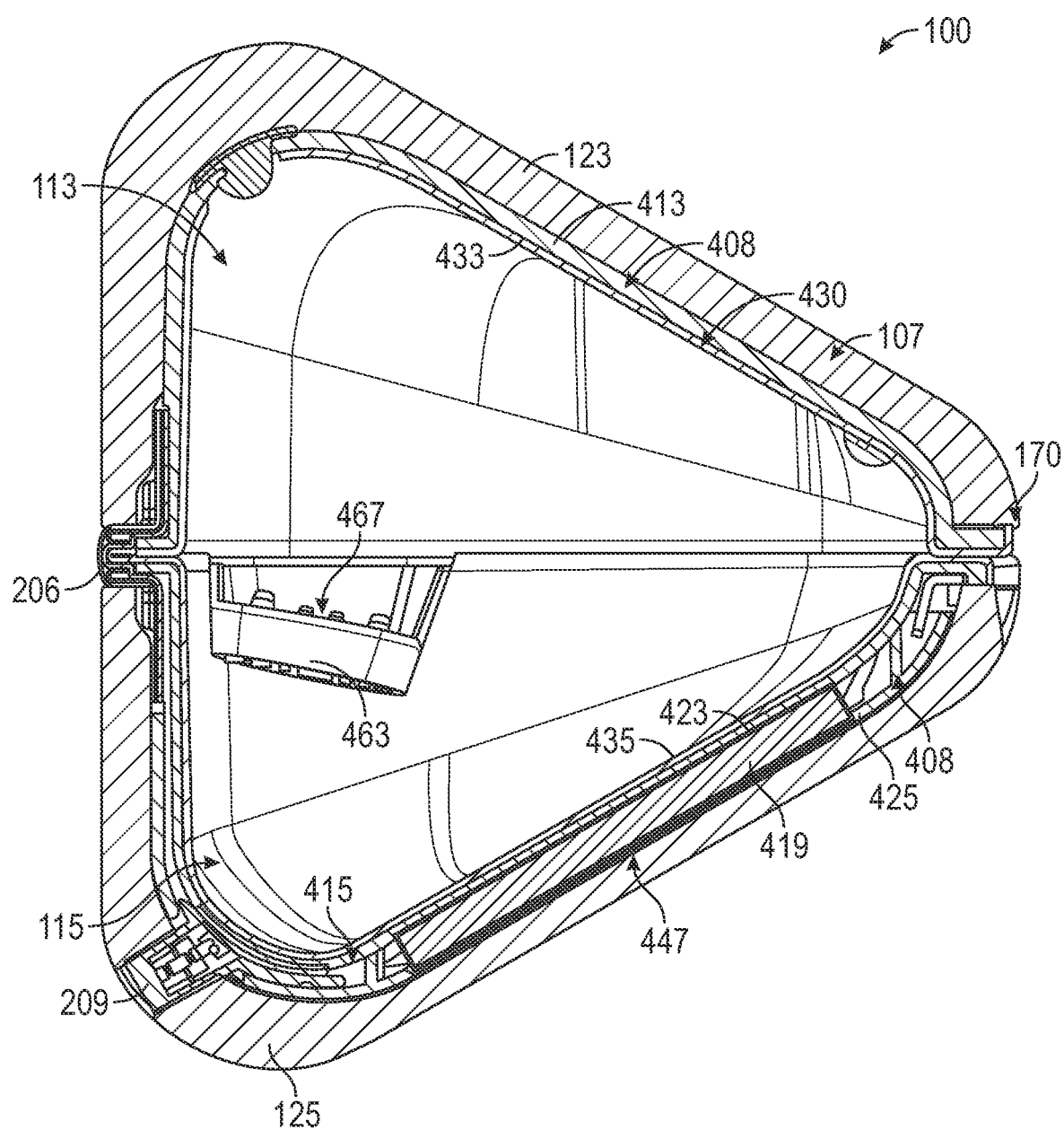
FIG. 4 is a cross-sectional side view of the eyewear device according to the example embodiment of FIG. 1, the case being in the closed condition.
Figure 5:
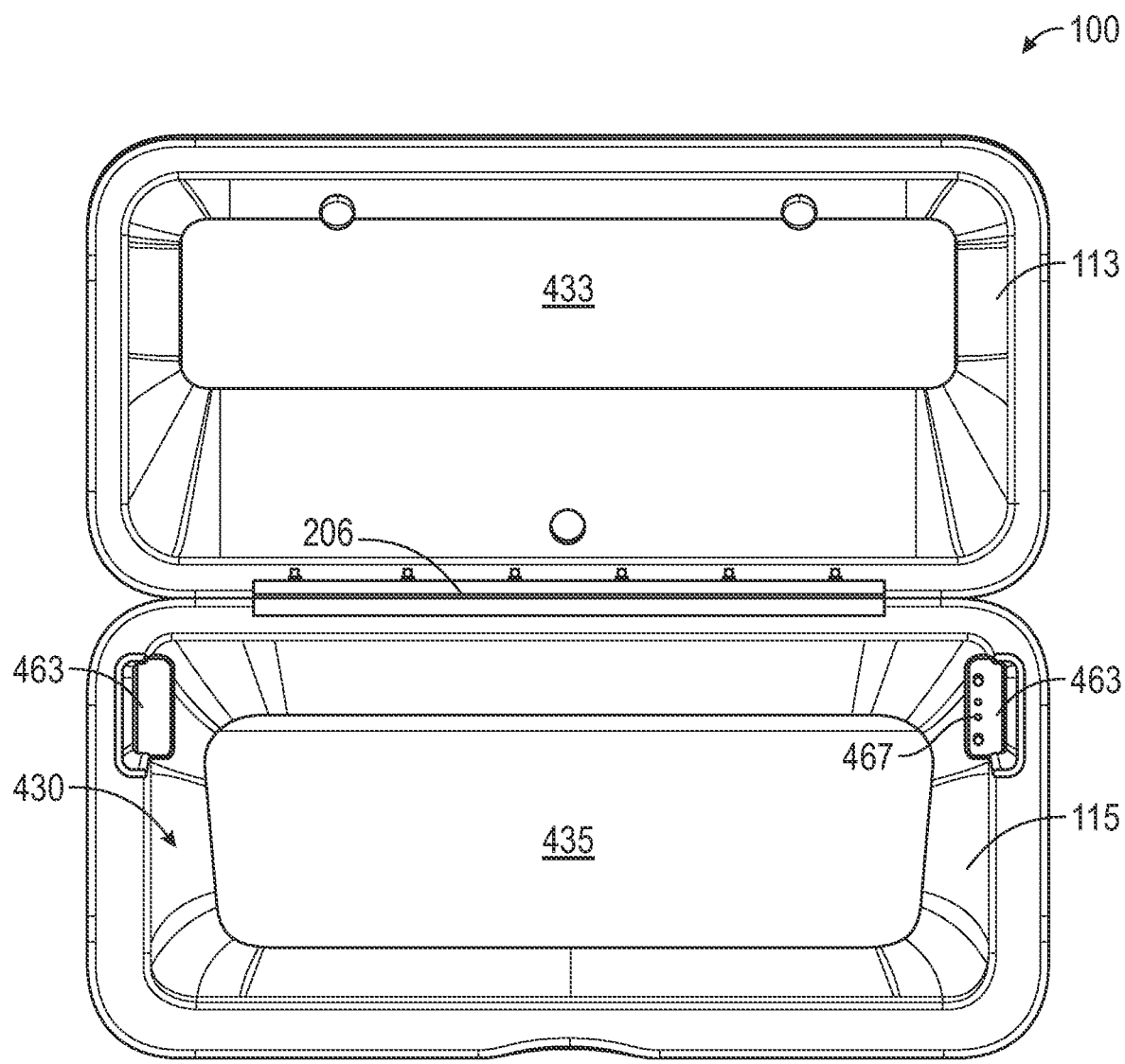
FIG. 5 is a top view of the carry case according to the example embodiment of FIG. 1, the case being in an opened condition.

FIG. 4 is a cross-sectional view of the multifunctional charging case 100, from which it can be seen that the top foam 123 and the bottom foam 125 (together providing the protective cover 107) are supported on a composite, substantially rigid frame 408 that provides an internal skeletal structure of the case 100. The frame 408 defines an internal holding space 430 for receiving and protectively stowing an eyewear device such as the example smart glasses 909 of FIG. 9. Consistent with the previously described clamshell construction of the case 100, the composite frame 408 is defined by a concave top shell 413 connected by the hinge 206 to a similarly shaped, oppositely orientated bottom shell 415. The concavities of the top shell 413 and the bottom shell 415 together define the holding space 430 when the case 100 is in the closed position, as shown in FIG. 4.

As can be seen in FIG. 4 (and as is most clearly evident in FIGS. 7 and 8), the top shell 413 is of one-piece construction and has no cavity interior thereto, while the bottom shell 415 is of composite, double-shell construction and defines an internal housing cavity 447 that holds one or more electronics components of the case 100. In this example embodiment, the housing cavity 447 houses a battery assembly (shown in disassembled, exploded form in FIG. 8), for brevity identified herein as the battery 419. The composite bottom shell 415 is provided by a bottom inner shell 423 received in a similarly shaped, larger bottom outer shell 425. A spacing between the bottom inner shell 423 and the bottom outer shell 425 provides the housing cavity 447.

Note that the electronics and the battery 419 housed in the housing cavity is substantially entirely isolated from the foam cover 107 and from the holding space 430 by relatively heat-resistant plastics sheet material of the bottom shell 415. As mentioned previously, one of both of the component shells 423, 425 of the bottom half 115 can in some embodiments be of a fire-resistant material, such as glass-filled nylon. In this example embodiment, the bottom outer shell 425 is of injection molded polycarbonate/ABS plastics material, while the bottom inner shell 423 is of a glass-filled nylon plastics material.

In this manner, material components that have relatively lower heat tolerance and that may be provided indirect exposure to the holding space 430 for scratch resistance and/or aesthetic purposes is substantially similarly isolated from relatively high maximum operating temperatures of the battery 419 (e.g., 40-70° C.) by the glass filled nylon bottom inner shell 423, which has significantly higher heat tolerance. In this example embodiment, a contact surface for the glasses 909 is provided by a spray-on nylon fiber liner forming a top flocking 433 and a bottom flocking 435. The provision of the flocking layer 433, 435 on those surfaces of the top and bottom shells 413, 415 that define the holding space 430 provides, inter alia, for scratch resistant-holding of the glasses 909 in the case 100.

In this example embodiment, the bottom inner shell 423 and the bottom outer shell 425 are permanently attached, e.g., being sealed together, so that the housing cavity 447 is permanently closed. In other embodiments, the inner and outer bottom shells 423, 425 can be detachably connected, so that the housing cavity 447 is close semi-permanently. This permits vocational removal and replacement of the battery 419.

Also visible in FIG. 4 is a connection arrangement provided within the holding space 430 for enabling coupling of the glasses 909 to electronics incorporated in the case 100 (in this example enabling a charging connection with the battery 419). In this example embodiment, the charging connection is provided by a pair of support pads 463 for supporting the complementary pair of glasses 909 in a charging position (FIG. 9), one of the support pads 463 having a charging connector 467 configured to connect to the glasses 909 when the glasses are received on the support pads 463. As can be seen in FIG. 5, the support pads 463 are located on opposite ends of the holding space 430 to support respective ends of a frame of the glasses 909, when the glasses 909 are in a folded condition. A connection port complementary to the charging connector 467 is exposed on the glasses frame, when the glasses 909 are folded, for complementary mating engagement with the charging connector 467 of the support pad 463. Note that only one of the support pads 463 is in this example provided with a charging connector 467. In other embodiments, however, both charging pads can be configured for connection with the glasses 909.

Turning briefly to FIG. 9, therein is shown a kit 900 consisting of the case 100 and the complementary glasses 909 according to the example embodiment, the glasses 909 being docked with case 100 by engagement of the glasses' charging port with the charging connector 467 provided on one of the support pads 463. In some embodiments, connection between the glasses 909 and the case electronics, when the glasses 909 are docked, provides exclusively for a power supply connection to charge an onboard battery of the glasses 909 by use of the case battery 419. In other embodiments, a docking connection between the case 100 and the glasses 909 can instead or in addition provide for data transfer between the glasses 909 and the case 100, and/or between the glasses 909 and an external device connected to the glasses 909 via the case 100. In such an example, the electronics incorporated in the case 100 can include a memory storage device configured to permit download and temporary storage of data (e.g., video clips) from the glasses 909 while docked. docked on the charging supports. The case 100 may in such case further include a data link, e.g., by wireless link or a USB port, to enable later download of stored content from the case memory to a separate device. Note that the some aspects of the glasses 909 and the case 100 may function consistent with the disclosure of Applicant's patent application Ser. No. 14/687,308, filed Apr. 15, 2015 and titled EYEWEAR HAVING SELECTIVELY EXPOSABLE FEATURE.

Figure 6:
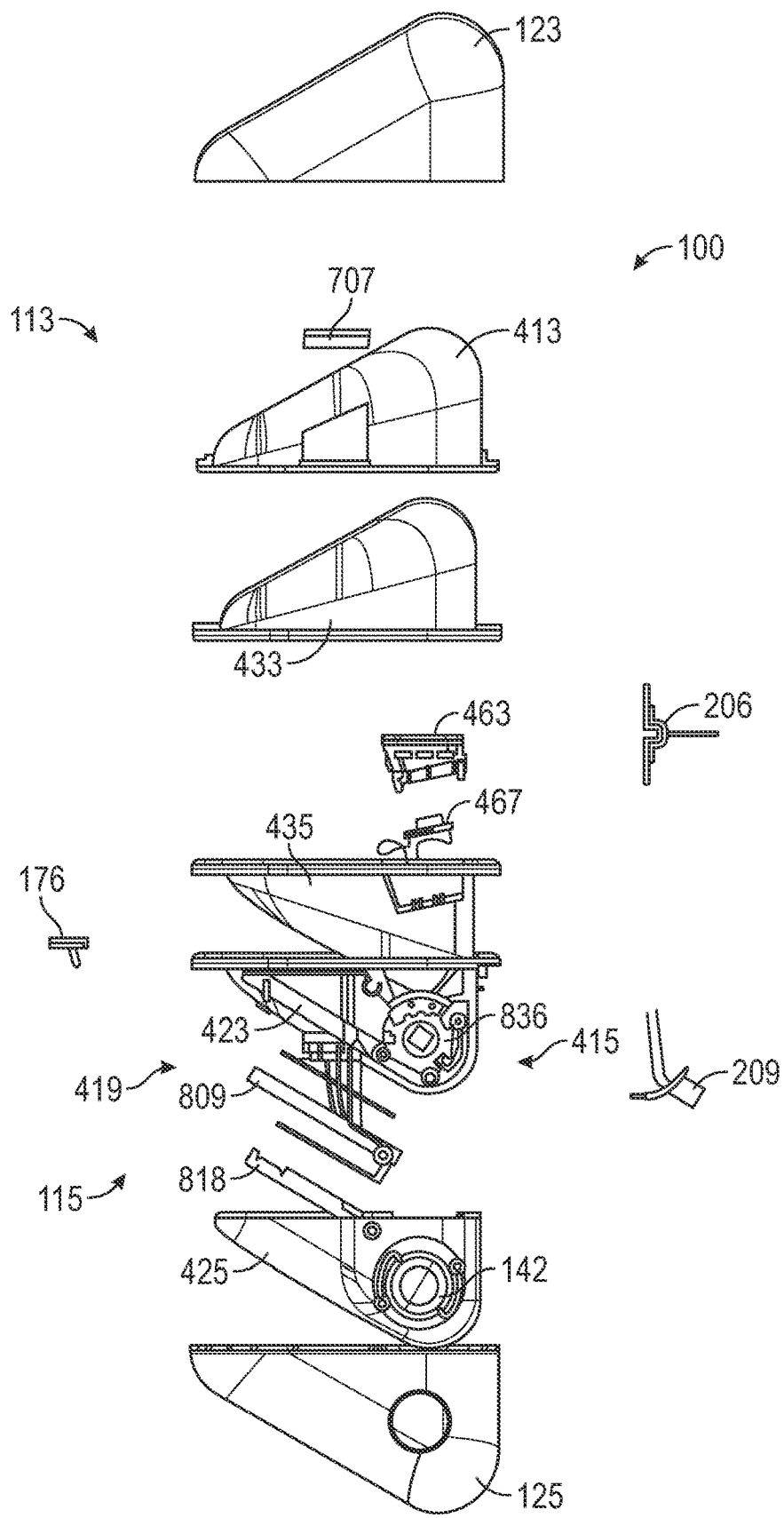
FIG. 6 is an exploded side view of a carry case according to the example embodiment of FIG. 1.

A number of further components of the case 100 can be seen in FIGS. 6-8, which for clarity of illustration and ready comprehension show exploded views respectively of the case 100 as a whole (FIG. 6), of the top half 113 (FIG. 7), and of the bottom half 115 (FIG. 8). Selected components that are visible in these views but which have not previously been described include: top and bottom closure magnets 707 (FIGS. 7 and 8); a lithium polymer cell battery pack 809 (FIG. 8); a stainless steel battery cover 818 (FIG. 8); a stainless steel battery cover grounding bracket 827 (FIG. 8); and a printed circuit board (PCB) 836 that provides a computer processor and controlling circuitry for controlling various electronic functions of the battery 419 and the case 100. Item 176 is a weight attached to the lip of the bottom half 115 to reduce the risk of the case 100 tipping backwards when open. In other words, the lip weight 176 keeps a bottom surface of the case 100 flat against a substantially horizontal support surface, when the case 100 is in the opened condition, as shown in FIG. 9.

In use, the glasses 909 can be docked in the holding space 430 such that it is in charging connection with the battery 419, allowing charging of the onboard battery of the glasses 909. Although the glasses 909 can be charged in the opened condition shown in FIG. 9 (in which a charge level of the glasses battery can be indicated via a mode indicator 921 forming part of the glasses 909), charging of the glasses 909 can continue while the case 100 is closed for carrying.

While the glasses 909 are thus docked and stowed in the case 100, the protective foam cover 107 provides a measure of shock resistance not only to the glasses 909 contained inside, but also to the electronic components of the case 100, such as the battery 419, and the PCB 836. As noted previously, the external foam cover 107 thus provides not only broader shock protection than is the case with conventional eyewear carry cases, but additionally promotes continuous charging connection of the glasses 909 with the internal charging connector 467 by damping external shocks or bumps to the substantially rigid frame 408.

A number of functionalities are provided by the case 100 while the glasses 909 are stowed therein. In this example embodiment, a single press of the exterior button 139 causes display of a charge indication of the onboard battery of the glasses 909 being charged within. Instead, or in addition, operation of the button 139 can serve in some embodiments to trigger indication of a charge level of the battery 419 of the case 100. In this embodiment, the indicator 142 of the case 100 is configured automatically for display charge level of the battery 419 while the battery 419 is being charged by connection to an external power supply via the charge port 209. A further function of the press button 139 in this example embodiment is that holding down of the button 139 for a predefined interval (e.g., 10 seconds) triggers electronic reset of the case 100.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A carry case for an electronics-enabled eyewear device, the case comprising:
   a substantially rigid frame comprising walls that together define an interior holding space for the eyewear device, the rigid frame defining a tamper-resistant battery compartment integrated into a particular wall of the rigid frame, the battery compartment being isolated from the holding space by fire-resistant sheet material;
   a shock-resistant covering on an exterior surface of the frame, the covering being of a resiliently compressible material;
   a case battery housed in the battery compartment; and
   a connection arrangement carried by the frame and coupled to the case battery, the connection arrangement being accessible from the holding space to enable electrical coupling of the eyewear device, when located in the holding space, with the case battery for charging the eyewear device.

2. The carry case of claim 1, wherein the fire-resistant sheet material is tolerant of exposure to continuous operating temperatures corresponding to that of the case battery during charging.

3. The carry case of claim 1, wherein the fire-resistant material comprises a glass filled nylon plastic material.

4. The carry case of claim 1, wherein at least part of the battery compartment is defined by the fire-resistant material.

5. The carry case of claim 1, wherein the battery compartment comprises a cavity defined by said particular wall of the frame.

6. The carry case of claim 5, wherein the battery compartment is configured such that the case battery housed therein is closed off from the battery compartment by a rigid material forming part of said particular wall.

7. The carry case of claim 6, wherein the battery compartment is configured such that the case battery housed therein is substantially entirely enclosed by a rigid material forming part of said particular wall, such that the case battery is shielded from contact with either the battery compartment or with the shock resistant shock-resistant covering.

8. The carry case of claim 1, wherein said particular wall of the rigid frame is provided by a composite frame component of double-shell construction, comprising a pair of complementary shells of formed sheet material that are nested one within another, the battery compartment being provided by a cavity defined between the nested shells due to differences in their respective formed shapes.

9. The carry case of claim 8, wherein the battery compartment is substantially entirely encapsulated between the sheet material of the respective shells forming the particular wall.

10. The carry case of claim 9, wherein the pair of shells are permanently connected together, thereby to prevent user access to an interior of the battery compartment.

11. The carry case of claim 10, wherein the pair of shells are of a thermoplastics sheet material, the shells being sealed together.

12. The carry case of claim 9, wherein the pair of shells are semi-permanently connected together.

13. The carry case of claim 8, wherein at least one of the pair of shells of the composite frame component is formed of the fire-resistant sheet material.

14. The carry case of claim 8, wherein both shells of the composite frame component is of the fire-resistant sheet material.

15. The carry case of claim 8, wherein an inner one of the pair of shells of the composite frame component is of the fire-resistant sheet material, the other, outer one of the pair of shells being of a thermoplastic sheet material which is less fire-resistant than that of the inner shell.

16. A method comprising:
   storing an electronics-enabled eyewear device in a carry case for the eyewear device, the case comprising:
      a substantially rigid frame comprising walls that together define an interior holding space for the eyewear device, the rigid frame defining a tamper-resistant battery compartment integrated into a particular wall of the rigid frame, the battery compartment being isolated from the holding space by fire-resistant sheet material; and
      a shock-resistant covering on an exterior surface of the frame, the covering being of a resiliently compressible material;
   housing a charging battery within the battery compartment of the particular wall;

establishing an electrical connection between the case battery and an on-board battery of the eyewear device via a connection arrangement forming part of the case; and charging the on-board battery of the eyewear device via the arrangement while the eyewear device is located in the holding space.

17. The method of claim 16, wherein said particular wall of the rigid frame is provided by a composite frame component of double-shell construction, comprising a pair of complementary shells of formed sheet material that are nested one within another, the battery compartment being provided by a cavity defined between the nested shells due to differences in their respective formed shapes.

18. The method of claim 17, where in housing the charging battery within the battery compartment comprises reception of the charging battery in the battery compartment such that the charging battery is substantially entirely encapsulated between the sheet material of the respective shells forming the particular wall.

19. The method of claim 17, wherein at least one of the pair of shells of the composite frame component is formed of the fire-resistant sheet material.

20. The method of claim 17, wherein an inner one of the pair of shells of the composite frame component is of the fire-resistant sheet material, the other, outer one of the pair of shells being of a thermoplastic sheet material which is less fire-resistant than that of the inner shell.

* * * * *